(12) United States Patent
Kamada et al.

(10) Patent No.: US 9,062,760 B2
(45) Date of Patent: Jun. 23, 2015

(54) AUTOMATIC TRANSMISSION CONTROL METHOD AND CONTROL APPARATUS, AND AUTOMATIC TRANSMISSION SYSTEM

(75) Inventors: Shinya Kamada, Kure (JP); Yosuke Takaie, Obu (JP); Tomohiro Kubo, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 61 days.

(21) Appl. No.: 14/110,913

(22) PCT Filed: Apr. 18, 2012

(86) PCT No.: PCT/JP2012/002695
§ 371 (c)(1),
(2), (4) Date: Oct. 9, 2013

(87) PCT Pub. No.: WO2012/144207
PCT Pub. Date: Oct. 26, 2012

(65) Prior Publication Data
US 2014/0033845 A1 Feb. 6, 2014

(30) Foreign Application Priority Data
Apr. 19, 2011 (JP) ................................. 2011-092901

(51) Int. Cl.
*F16H 59/00* (2006.01)
*F16H 61/00* (2006.01)
(Continued)

(52) U.S. Cl.
CPC .......... *F16H 61/0021* (2013.01); *Y10T 74/1926* (2015.01); *F16H 61/061* (2013.01); *F16H 2061/062* (2013.01)

(58) Field of Classification Search
CPC .............. F16H 61/061; F16H 61/0021; F16H 2061/062; F16H 2061/0477; F16H 2061/146
USPC ...................... 74/335, 336 R; 701/60, 66, 68
See application file for complete search history.

(56) References Cited

U.S. PATENT DOCUMENTS

| 4,707,789 A | 11/1987 | Downs et al. |
| 5,070,747 A * | 12/1991 | Lentz et al. ................... 477/149 |

(Continued)

FOREIGN PATENT DOCUMENTS

| CN | 101424336 A | 5/2009 |
| CN | 101903663 A | 12/2010 |

(Continued)

OTHER PUBLICATIONS

International Search Report; PCT/JP2012/002695; Jul. 10, 2012.
(Continued)

*Primary Examiner* — William Kelleher
*Assistant Examiner* — Jake Cook
(74) *Attorney, Agent, or Firm* — Studebaker & Brackett PC (57) ABSTRACT

A method comprises a pre-charge step of pre-charging operating oil; a holding step of holding an operating pressure at an oil pressure less than an oil pressure during the pre-charge, for a given period of time; and a raising step of raising the operating pressure to cause an engagement-side friction element to be engaged. The method further comprises a setting step of setting a pre-charge period in the pre-charge step. The setting step includes predicting a timing at which the engagement-side friction element is to be engaged; actually measuring a timing at which the engagement-side friction element has been actually engaged; and setting the period of the pre-charge step to allow a difference between the timings to become smaller.

20 Claims, 7 Drawing Sheets

(51) Int. Cl.
*F16H 63/00* (2006.01)
*F16H 61/06* (2006.01)

(56) References Cited

U.S. PATENT DOCUMENTS

| | | | |
|---|---|---|---|
| 5,103,694 A * | 4/1992 | Kobayashi et al. | 477/162 |
| 5,580,332 A | 12/1996 | Mitchell et al. | |
| 5,902,212 A | 5/1999 | Kamada et al. | |
| 6,101,438 A | 8/2000 | Staiger et al. | |
| 6,259,983 B1 | 7/2001 | Tsutsui et al. | |
| 2004/0209737 A1 * | 10/2004 | Lee | 477/174 |
| 2009/0111642 A1 | 4/2009 | Sah et al. | |
| 2009/0159389 A1 | 6/2009 | Imediegwu | |
| 2011/0081938 A1 | 4/2011 | Komine et al. | |

FOREIGN PATENT DOCUMENTS

| | | |
|---|---|---|
| DE | 19546292 A1 | 6/1997 |
| GB | 2327990 A | 2/1999 |
| JP | 03-028571 A | 2/1991 |
| JP | H05-17976 B2 | 3/1993 |
| JP | 07-174217 A | 7/1995 |
| JP | 08-326897 A | 12/1996 |
| JP | 09-269055 A | 10/1997 |
| JP | 11-082704 A | 3/1999 |
| JP | H11-63202 A | 3/1999 |
| JP | 2000-501822 A | 2/2000 |
| JP | 2001-349420 A | 12/2001 |
| JP | 2002-089701 A | 3/2002 |
| JP | 2006-207602 A | 8/2006 |
| JP | 2007-198564 A | 8/2007 |
| JP | 2008-106892 A | 5/2008 |
| JP | 2009-216102 A | 9/2009 |
| JP | 4743432 B2 | 8/2011 |

OTHER PUBLICATIONS

The First Office Action issued by the Chinese Patent Office on Dec. 3, 2014, which corresponds to Chinese Patent Application No. 201280019338.0 and is related to U.S. Appl. No. 14/110,913; with English language summary.

An Office Action; "Notice of Reasons for Rejection," issued by the Japanese Patent Office on Sep. 2, 2014, which corresponds to Japanese Patent Application No. 2013-510889 and is related to U.S. Appl. No. 14/110,913; with English language summary.

* cited by examiner

AUTOMATIC TRANSMISSION CONTROL METHOD AND CONTROL APPARATUS, AND AUTOMATIC TRANSMISSION SYSTEM

TECHNICAL FIELD

The present invention relates to a control method and control apparatus for an automatic transmission mountable on a vehicle, and an automatic transmission system, and belongs to a technical filed of vehicle automatic transmissions.

BACKGROUND ART

A vehicle-mountable automatic transmission is constructed by combining a torque converter and a speed change gear mechanism, and configured to selectively engage one or more of a plurality of friction elements such as clutches and brakes depending on a vehicle driving state, to change an operating state of the speed change gear mechanism, i.e., a power (driving force) transmission path, thereby automatically performing a speed change to establish a given speed stage. In this type of automatic transmission, a speed change between given two speed stages is performed by, among the plurality of friction elements, disengaging a given disengagement-side friction element and concurrently engaging other engagement-side friction element, in some cases.

During the above speed change, it is necessary to perform an operation of disengaging the disengagement-side friction element and an operation of engaging the engagement-side friction element, at an adequate relative timing. If the engagement-side friction element engaging operation goes too much ahead of the disengagement-side friction element disengaging operation, a state occurs transiently in which both of the friction elements are engaged. Consequently, the automatic transmission is placed somewhat in an interlocked state, which gives rise to a phenomenon, so-called "pull-in of output torque". On the other hand, if the engagement-side friction element engaging operation lags too much behind the disengagement-side friction element disengaging operation, a state occurs transiently in which both of the friction elements are disengaged. Consequently, the automatic transmission is placed somewhat in a neutral state, which gives rise to a phenomenon, so-called "blow-up of engine speed". These phenomena give a passenger uncomfortable feeling.

Therefore, it is desirable that an automatic transmission speed change operation is completed as quickly as possible, while avoiding the above phenomena. For this purpose, when an engagement operating pressure is supplied to an engagement-side friction element, a pre-charge can be performed to allow an oil passage extending from an oil pressure control valve for controlling the supply, to the engagement-side friction element, and an oil pressure chamber of the engagement-side friction element to be quickly filled with operating oil, as described, for example, in the following Patent Document 1.

After the pre-charge and then after an elapse of a holding period in which the operating pressure is held approximately constant for a given period of time, an engagement control is performed which is configured to raise the operating pressure again to fully engage the engagement-side friction element. In this case, an operation of the oil pressure control valve to supply the operating pressure is controlled by a control unit, to allow an operation of disengaging the disengagement-side friction element and an operation of engaging the engagement-side friction element to be performed at an adequate relative timing, as mentioned above.

In such an oil pressure control during a speed change, when the relative timing between the disengagement-side friction element disengaging operation and the engagement-side friction element engaging operation is not adequate, it is common practice to adjust the timing by controlling the engagement-side friction element engaging operation. However, it is not easy to accurately control the engagement-side friction element engaging operation to allow the timing to become adequate, while avoiding a situation where a speed change period becomes longer. Particularly, when a control operation of raising the operating pressure to fully engage the engagement-side friction element is started just after completion of the pre-charge, a shock is likely to occur due to rapid engagement of the engagement-side friction element.

LIST OF PRIOR ART DOCUMENTS

Patent Documents

Patent Document 1: JP 03-28571A

SUMMARY OF THE INVENTION

It is therefore an object of the present invention to provide an automatic transmission control method and control apparatus, and automatic transmission system, capable of performing an operation of disengaging a disengagement-side friction element and an operation of engaging an engagement-side friction element at an adequate relative timing, thereby attaining a satisfactory speed change operation.

Specifically, the present invention provides a method of controlling an automatic transmission, wherein the automatic transmission comprises a plurality of friction elements for changing an operating state of a speed change mechanism depending on a vehicle driving state, and wherein it is configured to perform a speed change by, among the plurality of friction elements, disengaging a given disengagement-side friction element and concurrently engaging other engagement-side friction element. The method comprises: a pre-charge step of, based on a speed change command, pre-charging operating oil to the engagement-side friction element; an oil pressure holding step of holding an operating pressure at an oil pressure less than an oil pressure during the pre-charge, for a given period of time; and a pressure raising step of raising the operating pressure to cause the engagement-side friction element to be engaged, wherein the pre-charge step, the oil pressure holding step and the pressure raising step are performed in this order as a process for engaging the engagement-side friction element during the speed change. The method further comprises a pre-charge period setting step of setting a period for the operating oil pre-charge in the pre-charge step, wherein the pre-charge period setting step includes: predicting a timing at which the engagement-side friction element is to be engaged through the steps for engaging the engagement-side friction element; actually measuring a timing at which the engagement-side friction element has been actually engaged through the steps; and setting the pre-charge period to allow a difference between the timings to become smaller, and wherein, in the pre-charge step during a next speed change, the pre-charge is performed with respect to the engagement-side friction element, for the pre-charge period set in the pre-charge period setting step.

The present invention also provides a control apparatus for an automatic transmission, wherein the automatic transmission comprises a plurality of friction elements for changing an operating state of a speed change mechanism depending on a vehicle driving state, and wherein it is configured to perform a speed change by, among the plurality of friction elements, disengaging a given disengagement-side friction element and concurrently engaging other engagement-side friction element. The control apparatus comprises: a pre-charge device for, based on a speed change command, pre-charging operating oil to the engagement-side friction element; an oil pressure holding device for, after the operating oil pre-charge by the pre-charge device, holding an operating pressure at an oil pressure less than an oil pressure during the pre-charge, for a given period of time; and a pressure raising device for, after the oil pressure holding operation by the oil pressure holding device, raising the operating pressure to cause the engagement-side friction element to be engaged, wherein the pre-charge device, the oil pressure holding device and the pressure raising device are provided as a means to engage the engagement-side friction element during the speed change The control apparatus further comprises a pre-charge period setting device for setting a period for the operating oil pre-charge by the pre-charge device, wherein the pre-charge period setting device is configured to predict a timing at which the engagement-side friction element is to be engaged by the devices for engaging the engagement-side friction element, while actually measuring a timing at which the engagement-side friction element has been actually engaged by the devices, and set the pre-charge period to allow a difference between the timings to become smaller, and wherein the pre-charge device is operable, during a next speed change, to perform the pre-charge with respect to the engagement-side friction element, for the pre-charge period set by the pre-charge period setting device.

The present invention further provides an automatic transmission system which comprises: a plurality of friction elements for changing an operating state of a speed change mechanism depending on a vehicle driving state; a hydraulic actuator for driving each of the friction elements; an oil pressure control circuit having an oil pressure control valve for controlling an oil pressure against the hydraulic actuator; an oil pressure detection device for detecting that the oil pressure against the hydraulic actuator is equal to or greater than a predetermined engagement pressure; and a control unit configured to receive an input of a signal from the oil pressure detection device, and control the oil pressure control valve. The control unit is operable: based on a speed change command, to control the oil pressure control valve to pre-charge operating oil to a given engagement-side friction element among the plurality of friction elements; after the operating oil pre-charge, to control the oil pressure control valve to hold an operating pressure at an oil pressure less than an oil pressure during the pre-charge, for a given period of time; and after the oil pressure holding operation, to control the oil pressure control valve to raise the operating pressure to cause the engagement-side friction element to be engaged. Further, the control unit is operable to predict a timing at which the engagement-side friction element is to be engaged, while actually measuring, based on the signal from the oil pressure detection device, a timing at which the engagement-side friction element has been actually engaged, and set the operating oil pre-charge period to allow a difference between the timings to become smaller, wherein the control unit is operable, during a next speed change, to control the oil pressure control valve to pre-charge operating oil to the hydraulic actuator of the engagement-side friction element, for the set pre-charge period.

These and other objects, features and advantages of the present invention will become apparent upon reading of the following detailed description along with the accompanying drawings.

DESCRIPTION OF EMBODIMENTS

The present invention will now be described based on an embodiment thereof. The following embodiment corresponds to an embodiment of an automatic transmission control apparatus and an automatic transmission system according to the present invention, and an operation in the following embodiment constitutes an embodiment of an automatic transmission control method according to the present invention.

Figure 1:
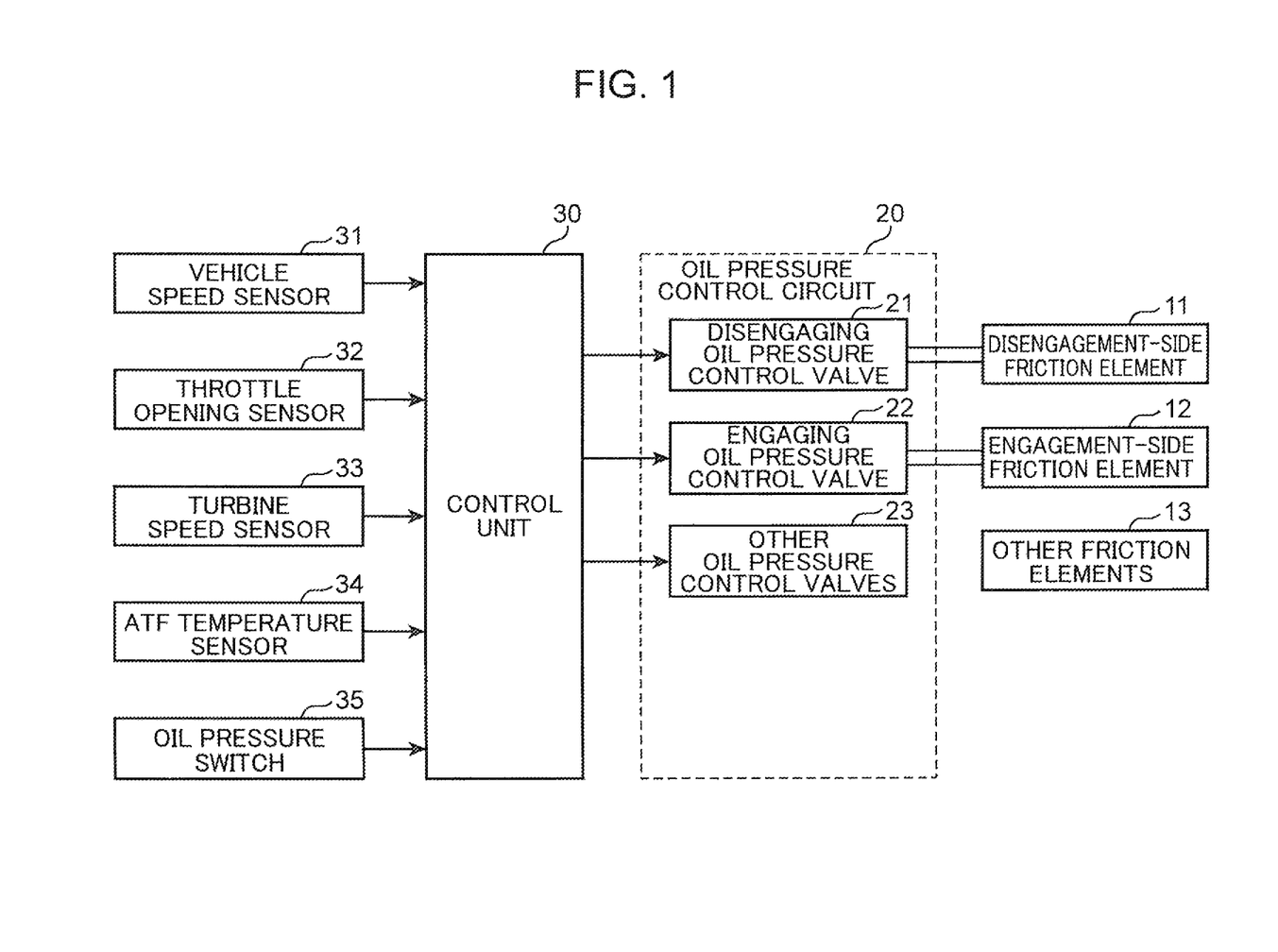
FIG. 1 is a control system diagram of a control apparatus according to one embodiment of the present invention.

FIG. 1 illustrates a system 1 for controlling an automatic transmission, in this embodiment. The system 1 comprises: an oil pressure control circuit 20 for controlling engagement and disengagement of each of a plurality of friction elements 11 to 13 provided in the automatic transmission; and a control unit 30 for controlling various oil pressure control valves 21 to 23 each composed, for example, of a linear solenoid valve, and provided in the oil pressure control circuit 20.

The control unit 30 is configured to receive an input of a plurality of signals for detecting respective states of a vehicle, the automatic transmission, etc., wherein the signals include: a signal from a vehicle speed sensor 31 for detecting a vehicle speed; a signal from a throttle opening sensor 32 for detecting an opening of an engine throttle; a signal from a turbine speed sensor 33 for detecting a turbine speed of a torque converter; a signal from an automatic transmission fluid (hereinafter referred to as "ATF") temperature sensor 34 for detecting a temperature of ATF; and a signal from an oil pressure switch 35 configured to be turned on when an operating pressure supplied to a friction element to be engaged during a given speed change is equal to or greater than a predetermined engagement pressure. The oil pressure switch 35 is an oil pressure detection device for detecting that an oil pressure against an aftermentioned hydraulic actuator (piston) is equal to or greater than a predetermined engagement pressure.

Further, the control unit 30 is configured to control the various oil pressure control valves 21 to 23 of the oil pressure control circuit 20 based on the signals, to selectively engage one or more of the plurality of friction elements 11 to 13, thereby attaining a speed stage depending on a vehicle driving state.

In this case, between given speed stages, a speed change is performed by disengaging a given (the number is not limited to one) friction element (hereinafter referred to as "disengagement-side friction element") 11 and concurrently engaging other (the number is not limited to one) friction element (hereinafter referred to as "engagement-side friction element") 12, wherein the control unit 30 is operable to control respective operations of a disengaging oil pressure control valve 21 and an engaging oil pressure control valve 22 for controlling respective operating pressure against the disengagement-side and engagement-side friction elements 11, 12, to allow an engagement operation of the engagement-side friction element 12 to be performed at an adequate relative timing with respect to a disengagement operation of the disengagement-side friction element 11.

The control for the disengagement-side and engagement-side friction elements 11, 12 during the above speed change will be described below.

Figure 2:
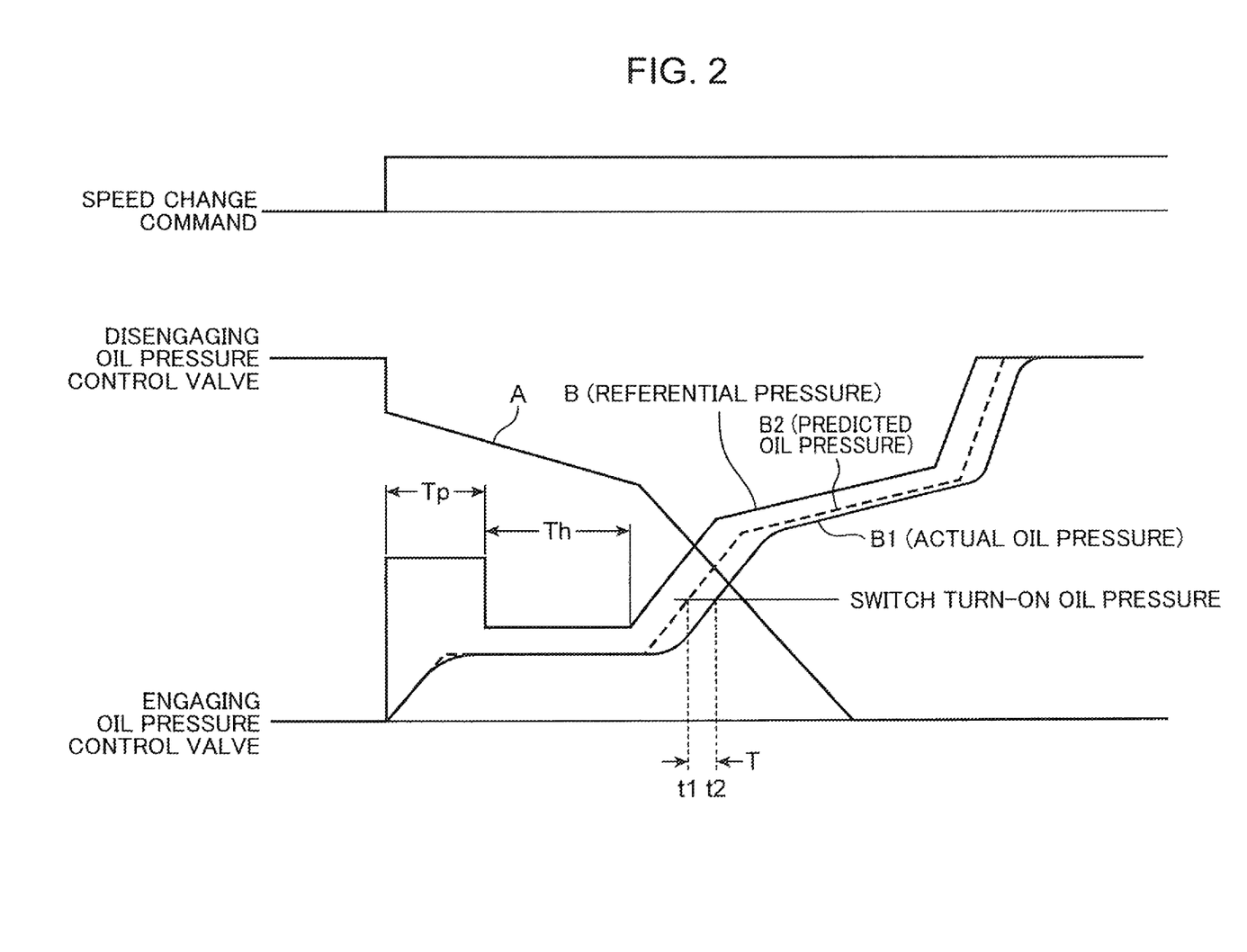
FIG. 2 is a time chart of a speed change control in this embodiment.

As illustrated in FIG. 2, when a speed change command is generated within the control unit 30, the control unit 30 is operable to output a control signal A to the disengaging oil pressure control valve 21 which controls the operating pressure against the disengagement-side friction element 11, to cause the valve 21 to be closed from a state in which it is opened fully or at a given opening, and concurrently output a control signal B to the engaging oil pressure control valve 22 which controls the operating pressure against the engagement-side friction element 12, to cause the valve 22 to be opened fully or at a given opening from a fully closed state.

Now, output values (openings of the oil pressure control valves 21, 22) of these control signals are converted into oil pressures, and a signal designated by the code A and a signal designated by the code B are defined as a disengage-side referential pressure A and an engage-side referential pressure B, respectively.

The engage-side referential pressure B is set such that it rises once and falls, whereafter it re-rises. This is because, during engagement of the engagement-side friction element 12, a pre-charge is performed to allow an oil passage extending from the engaging oil pressure control valve 22 to the engagement-side friction element 12, and an oil pressure chamber of the friction element 12, to be quickly filled with operating oil. As a result of controlling the oil pressure according to the engage-side referential pressure B, during engagement of the engagement-side friction element 12, the following steps are attained: a pre-charge step of maintaining the opening of the oil pressure control valve 22 at a relatively large predetermined opening, for a given period of time Tp from a time of the generation of the speed change command (the given period of time will hereinafter be referred to as "pre-charge period"); an oil pressure holding step of holding an operating pressure (more specifically, the referential pressure B) at a given pressure less than an oil pressure during the pre-charge, for a given period of time Th, as a buffer period for preventing the operating pressure from rapidly rising just after the pre-charge; and a pressure raising step of, after the oil pressure holding step, raising the operating pressure to cause the engagement-side friction element 12 to be fully engaged.

On the other hand, the disengage-side referential pressure A is set such that it initially gradually declines, and then declines at a more rapid decline rate than before. As a result of controlling the oil pressure according to such a disengage-side referential pressure A, during disengagement of the disengagement-side friction element 11, the following steps are attained: a preliminary disengagement step of gradually reducing an operating pressure against the disengagement-side friction element 11 correspondingly to the pre-charge step and the oil pressure holding step to prepare for disengagement of the disengagement-side friction element 11; and a final disengagement step of reducing the operating pressure against the disengagement-side friction element 11 relatively quickly, correspondingly to the pressure raising step to disengage the disengagement-side friction element 11. In the preliminary disengagement step, the disengagement-side friction element 11 does not slip yet. Then, in the final disengagement step, the disengagement-side friction element 11 will start slipping.

As above, respective operating pressures against the disengagement-side and engagement-side friction elements 11, 12 are controlled by the oil pressure control valves 21, 22 operating according to the referential pressures A, B. In this process, an actual oil pressure against the disengagement-side friction element changes relatively accurately according to the disengage-side referential pressure A, whereas an actual oil pressure against the engagement-side friction element rises in the pressure raising step, in a delayed manner with respect to rise of the engage-side referential pressure B, as designated by the code B1.

This delay is different per automatic transmission. Moreover, even in the same automatic transmission, it will change over time along with a change in piston stroke length of the engagement-side friction element 12, etc. In the above description, the term "piston" means a hydraulic actuator for driving each of the friction elements 11 to 13. Therefore, the control unit 30 is configured to predict a change of an operating pressure to be supplied to the engagement-side friction element 12, based on the engage-side referential pressure B, and perform control for allowing the actual oil pressure B1 to conform to or come maximally close to a resulting predicted oil pressure B2. This control will be described below.

Figure 3:
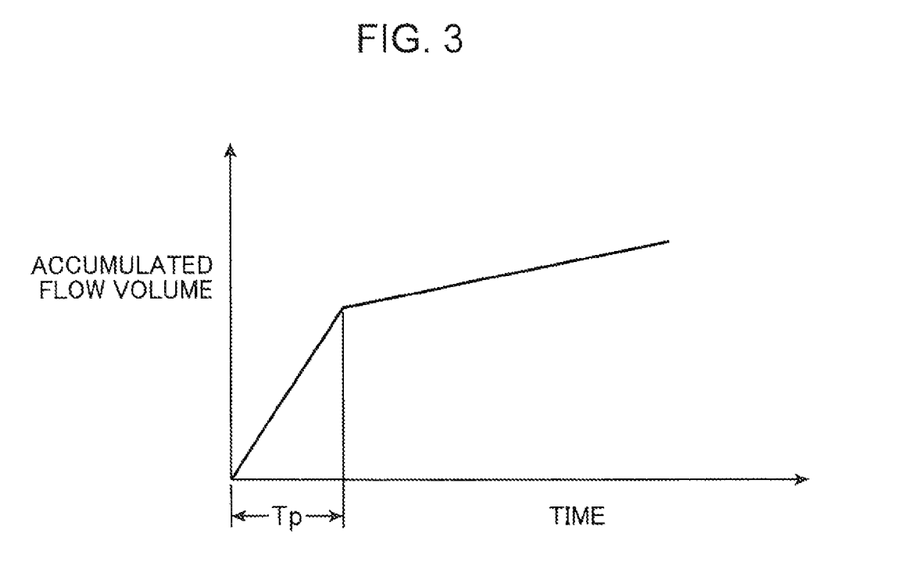
FIG. 3 is an explanatory graph of a change in accumulated flow volume with respect to an elapsed time from a time of start of a speed change.

First of all, a technique of predicting the operating pressure to be supplied to the engagement-side friction element 12 will be described. In the case where the opening of the engaging oil pressure control valve 22 is set as indicated by the referential pressure B in FIG. 2, an accumulated value of a flow volume discharged from the oil pressure control valve 22 after the generation of the speed change command rapidly increases during the pre-charge period Tp and then moderately increases, with respect to an elapse of time, as illustrated in FIG. 3.

Figure 4:
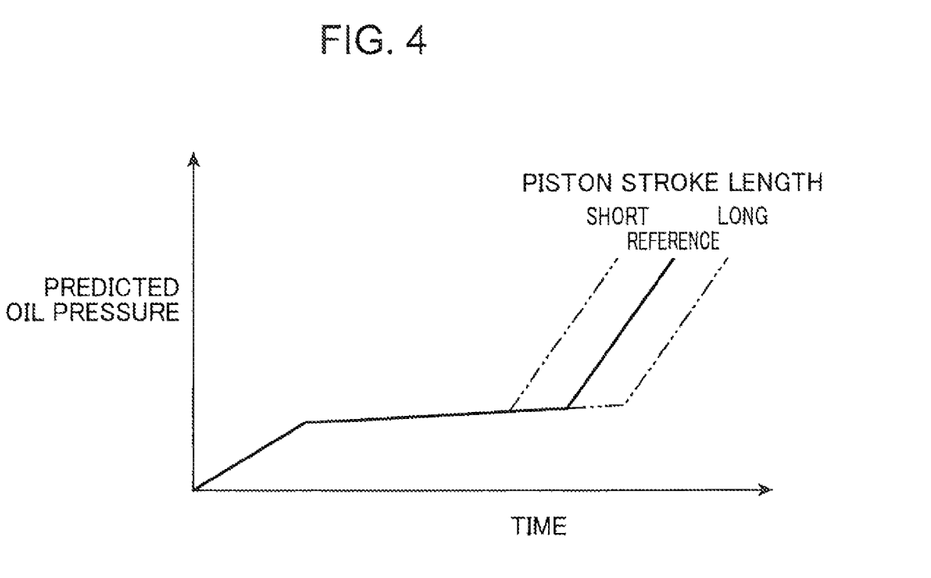
FIG. 4 is an explanatory graph of a change in predicted oil pressure with respect to the elapsed time.

Then, after the accumulated flow volume increases in this way, and the oil passage extending from the oil pressure control valve 22 to the engagement-side friction element 12 and the oil pressure chamber of the engagement-side friction element 12 are filled with the operating oil, the piston is further pressed. Thus, as illustrated in FIG. 4, with respect to an elapse of time after the generation of the speed change command, an oil pressure of the operating pressure rapidly rises by the pre-charge, and then has a constant held pressure or slightly rises during a period in which the piston is moved over its stroke length, whereafter, from a time when the piston reaches its stroke end, the oil pressure will re-rise toward a final target engagement pressure.

In this process, when the piston stroke length is less than a reference value based on a design dimension, a timing of the rise toward the target engagement pressure is advanced with respect to that in the case where it is equal to the reference value. On the other hand, when the piston stroke length is greater than the reference value, the timing of the rise toward the target engagement pressure is retarded with respect to that in the case where it is equal to the reference value.

Figure 5:
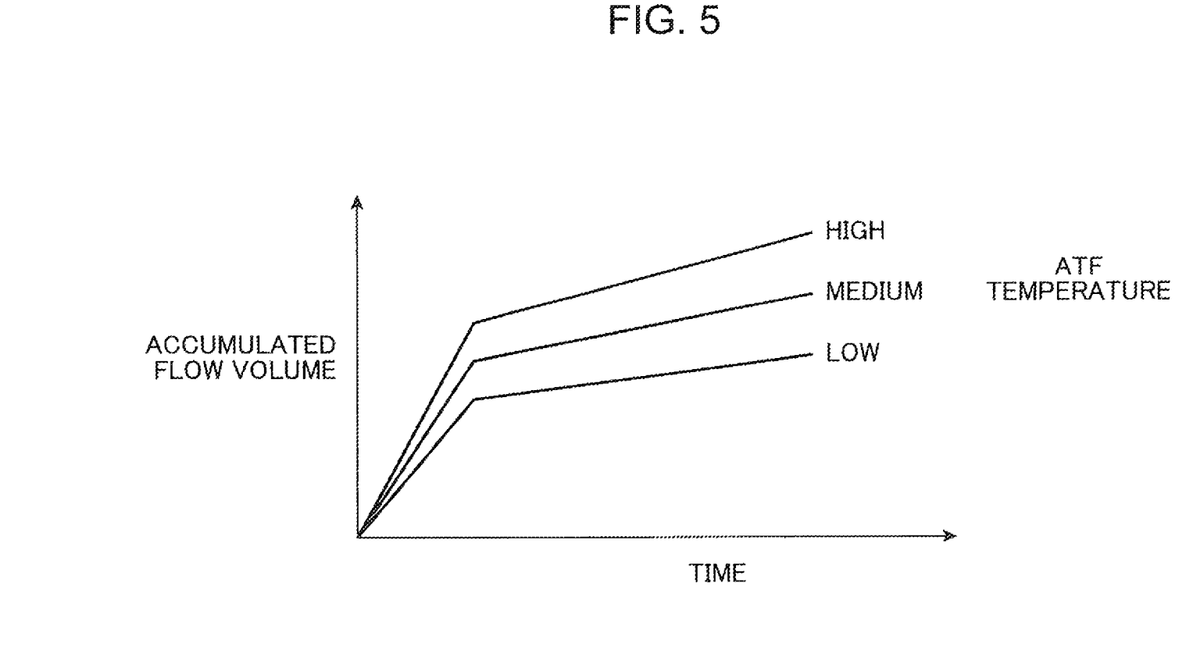
FIG. 5 is an explanatory graph of a relationship between an ATF temperature and an accumulated flow volume.

Further, a relation of the accumulated flow volume with respect to the elapsed time varies depending on an ATF temperature. As illustrated in FIG. 5, as the ATF temperature becomes higher and thus a viscosity of ATF becomes lower, the accumulated flow volume becomes larger with respect to the same elapsed time. On the other hand, as the ATF temperature becomes lower and thus the viscosity of ATF becomes higher, the accumulated flow volume becomes smaller with respect to the same elapsed time.

In this manner, based on the engage-side referential pressure B, the predicted oil pressure B2 will be calculated depending on the piston stroke length and the ATF temperature. Then, the control for allowing the actual oil pressure B1 to conform to or come close to the predicted oil pressure B2, depending on a timing at which the predicted oil pressure B2 and the actual oil pressure B1 reach an oil pressure which causes turn-on of the oil pressure switch 35 illustrated in FIG. 1 (turn-on oil pressure of the oil pressure switch 35). Next, this control will be described based on the flowchart illustrated in FIG. 6.

Figure 6:
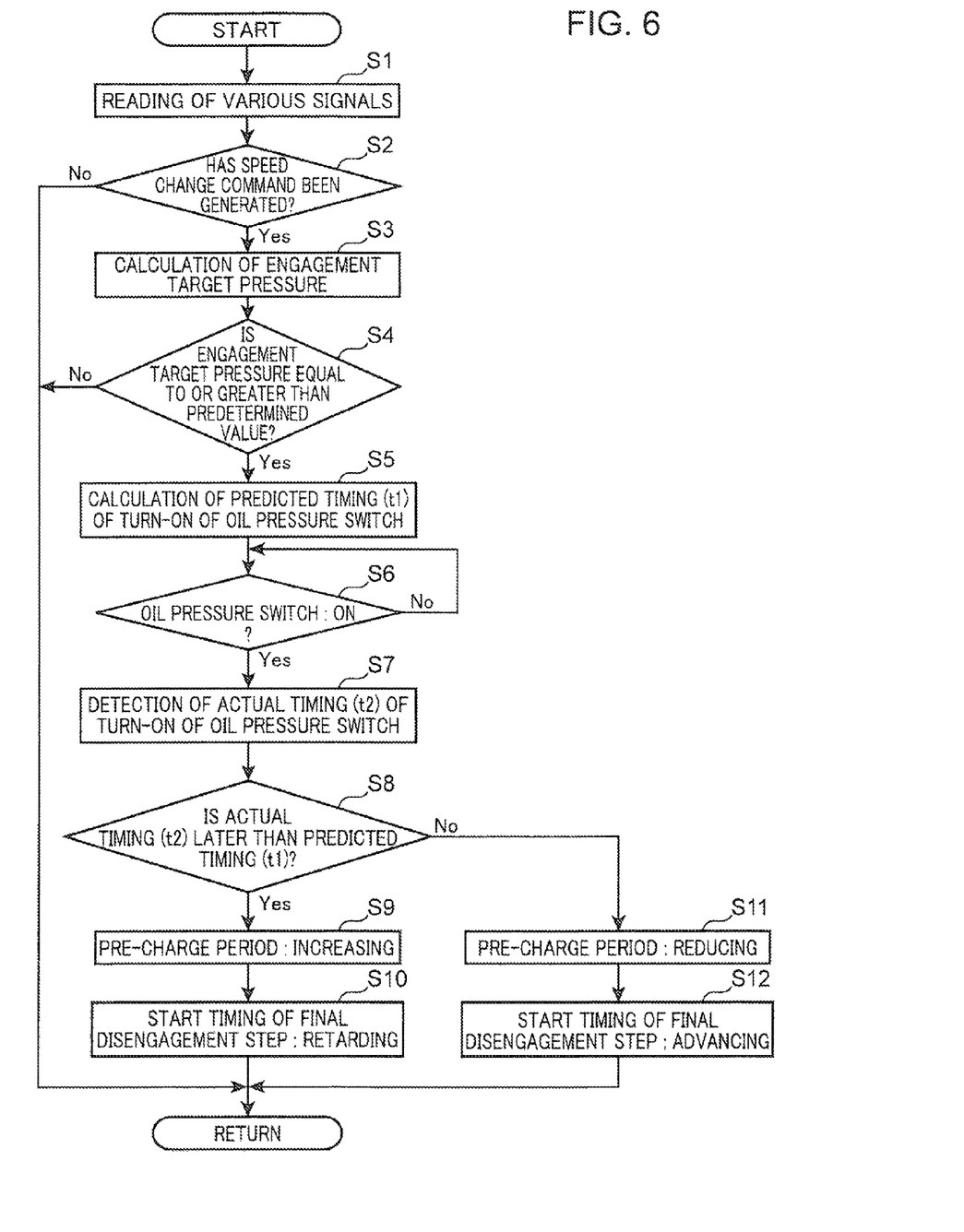
FIG. 6 is a flowchart illustrating a pre-charge control operation during a speed change.

First of all, the control unit 30 receives, in Step S1, an input of signals from the various sensors 31 to 34 and the switch 35 illustrated in FIG. 1, and, determines, in Step S2, whether or not the speed change command has been generated. Then, when it is determined, in the Step S2, that the speed change command has been generated, a target value of an engagement pressure (target engagement pressure) depending on a torque or a rotational speed to be transmitted by the engagement-side friction element 12 is calculated based on a throttle opening indicated by the throttle opening sensor 32 and a turbine speed indicated by the turbine speed sensor 33, in Step S3. Then, in Step S4, it is determined whether or not the target engagement pressure is equal to or greater than a predetermined value set to the turn-on oil pressure of the oil pressure switch 35 (i.e., the aforementioned predetermined engagement pressure).

When the target engagement pressure is less than the predetermined value, the oil pressure switch 35 is likely to fail to be turned on even when the operating pressure reaches the target engagement pressure, due to a tolerance and/or a variation of the turn-on oil pressure of the switch 35. Thus, in this case, the following control is not performed.

On the other hand, when there is no possibility of the failure, a timing at which the predicted oil pressure B2 calculated in the above manner reaches the turn-on oil pressure of the oil pressure switch 35, i.e., a timing t1 at which the switch 35 is turned on when the actual oil pressure B1 rises in conformity to the predicted oil pressure B2 (the timing t1 will hereinafter be referred to as "predicted timing"), is calculated, in Step S5.

Subsequently, after waiting until the oil pressure switch 35 is turned on in Step S6, a timing of the turn-on (hereinafter referred to as "actual timing") t2 is detected in Step S7. Then, in Step S8, the predicted timing t1 and the actual timing t2 of turn-on of the oil pressure switch 35 are compared with each other.

As a result of the comparison, when the actual timing t2 is later than the predicted timing t1, the pre-charge period Tp is increased depending on a difference T (t2−t1) therebetween, in Step S9. On the other hand, when the actual timing t2 is earlier than the predicted timing t1, the pre-charge period Tp is reduced depending on a difference T' (t1−t2) therebetween, in Step S11. Then, in either case, a period of time Th of the oil pressure holding step is kept constant.

Additionally, when the actual timing t2 is later than the predicted timing t1, i.e., when the pre-charge period Tp is increased, a start timing of the final disengagement step with respect to the disengagement-side friction element 11, i.e., a start timing of the relatively rapid decline of the operating pressure against a hydraulic actuator (piston) of the disengagement-side friction element 11, is retarded in Step S10. On the other hand, when the actual timing t2 is earlier than the predicted timing t1, i.e., when the pre-charge period Tp is reduced, the start timing of the final disengagement step with respect to the disengagement-side friction element 11, i.e., the start timing of the relatively rapid decline of the operating pressure against the hydraulic actuator (piston) of the disengagement-side friction element 11, is advanced in Step S12.

In this embodiment, in the Step S9 or S11, the pre-charge period Tp is increased or reduced depending on the difference T between the predicted timing t1 and the actual timing t2, as mentioned above. On the other hand, the period Th of the oil pressure holding step is kept constant. Thus, a period of time from a timing of generation of the speed change command through until a timing of completion of the oil pressure holding step (start timing of the pressure raising step) is increased or reduced. As a result, the rise of the referential pressure B and the predicted oil pressure B2 illustrated in FIG. 2 in conjunction with the start of the pressure raising step is temporally retarded or advanced (when the pre-charge period Tp is changed, the actual oil pressure B1 conforms to or comes close to the predicted oil pressure B2). Thus, in the case where the pre-charge period Tp is increased, the rise of the referential pressure B and the predicted oil pressure B2 in conjunction with the start of the pressure raising step is temporally retarded, so that a difference from the start timing of the final disengagement step with respect to the disengagement-side friction element 11 becomes larger. Consequently, the automatic transmission is placed somewhat in a neutral state, which is likely to cause the engine speed blow-up phenomenon. On the other hand, in the case where the pre-charge period Tp is reduced, the rise of the referential pressure B and the predicted oil pressure B2 in conjunction with the start of the pressure raising step is temporally advanced, so that the difference from the start timing of the final disengagement step with respect to the disengagement-side friction element 11 becomes smaller. Consequently, the automatic transmission is placed somewhat in an interlocked state, which is likely to cause the output torque pull-in phenomenon.

That is, when it is determined, in the Step S8, that the actual timing t2 is later than the predicted timing t1, an engagement operation of the engagement-side friction element 12 is somewhat delayed with respect to a disengagement operation of the disengagement-side friction element 11. Thus, although there is originally a high possibility of occurrence of the blow-up phenomenon, this problem cannot be sufficiently solved. On the other hand, when it is determined, in the Step S8, that the actual timing t2 is earlier than the predicted timing t1, the engagement operation of the engagement-side friction element 12 is somewhat advanced with respect to the disengagement operation of the disengagement-side friction element 11. Thus, although there is originally a high possibility of occurrence of the pull-in phenomenon, this problem cannot be sufficiently solved.

Therefore, in this embodiment, when it is attempted to adequately adjust a relative timing between the disengagement operation of the disengagement-side friction element 11 and the engagement operation of the engagement-side friction element 12, the engagement operation of the engagement-side friction element 12 is primarily controlled, and the disengagement operation of the disengagement-side friction element 11 is additionally controlled. Specifically, when the actual timing t2 is later than the predicted timing t1, and therefore the pre-charge period Tp is increased, the start timing of the final disengagement step with respect to the disengagement-side friction element 11 is retarded, as mentioned in connection with the Step S10, thereby promoting suppression of the blow-up phenomenon. On the other hand, when the actual timing t2 is earlier than the predicted timing t1, and therefore the pre-charge period Tp is reduced, the start timing of the final disengagement step with respect to the disengagement-side friction element 11 is advanced, as mentioned in connection with the Step S12, thereby promoting suppression of the pull-in phenomenon.

The Steps S5 to S9 and S11 performed by the control unit 30 are equivalent to a pre-charge period setting step of setting the period for the operating oil pre-charge in the pre-charge step, and the Steps S10 and S12 performed by the control unit 30 are equivalent to a disengagement start timing setting step of setting the start timing of the final disengagement step.

Further, the control unit 30 for controlling the engaging oil pressure control valve 22 to perform the pre-charge step, the oil pressure holding step and the pressure raising step with respect to the engagement-side friction element 12, as explained referring to FIG. 2, is equivalent to a pre-charge device, an oil pressure holding device and a pressure raising device, respectively. The control unit 30 for controlling the disengaging oil pressure control valve 21 to perform the preliminary disengagement step and the final disengagement step with respect to the disengagement-side friction element 11, as explained referring to FIG. 2, is equivalent to a preliminary disengagement device and a final disengagement device, respectively. The control unit 30 performing the Steps S5 to S9 and S11 is equivalent to a pre-charge period setting device, and the control unit 30 performing the Steps S10 and S12 is equivalent to a disengagement start timing setting device.

Thus, during a next speed change, in the case where the actual timing t2 is later than the predicted timing t1, the rise timing of the predicted oil pressure B2 or the predicted timing t1 of turn-on of the oil pressure switch 35 is retarded, and an amount of pre-charged operating oil is increased, by an amount corresponding to an increase in the pre-charge period Tp, so that the rise timing of the actual oil pressure B1 is advanced, and the actual timing t2 of turn-on of the oil pressure switch 35 is advanced. Consequently, a difference (time T) between the two timings t1, t2 is reduced to allow the actual oil pressure B1 to conform to or come close to the predicted oil pressure B2, as comparatively illustrated in FIGS. 7A and 7B.

Figure 7A:
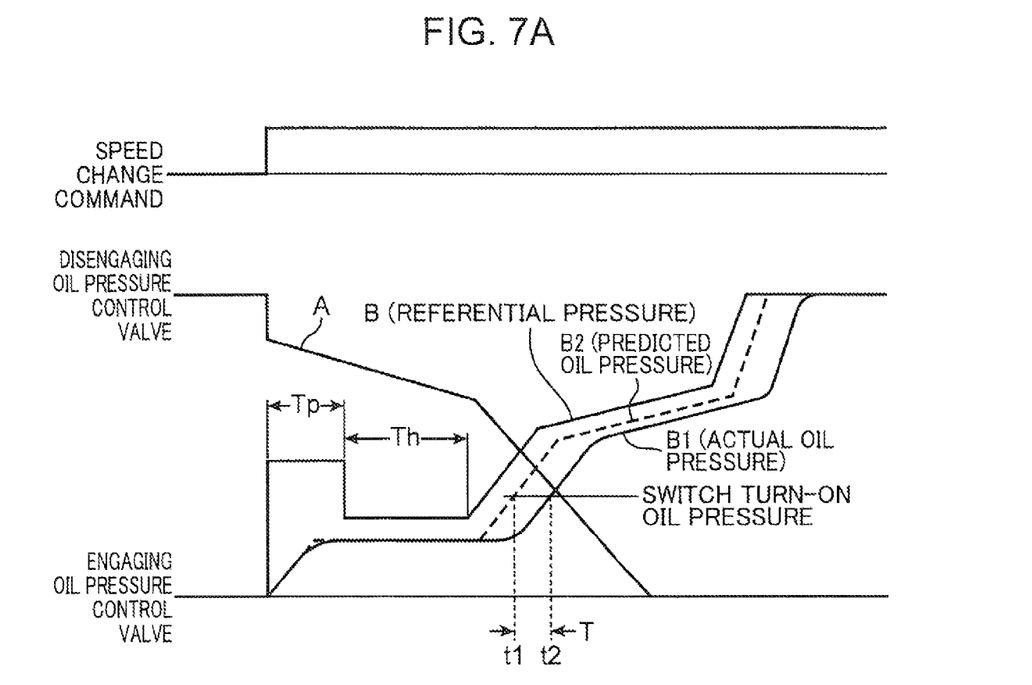
FIG. 7A is a time chart before increasing a pre-charge period.
Figure 7B:
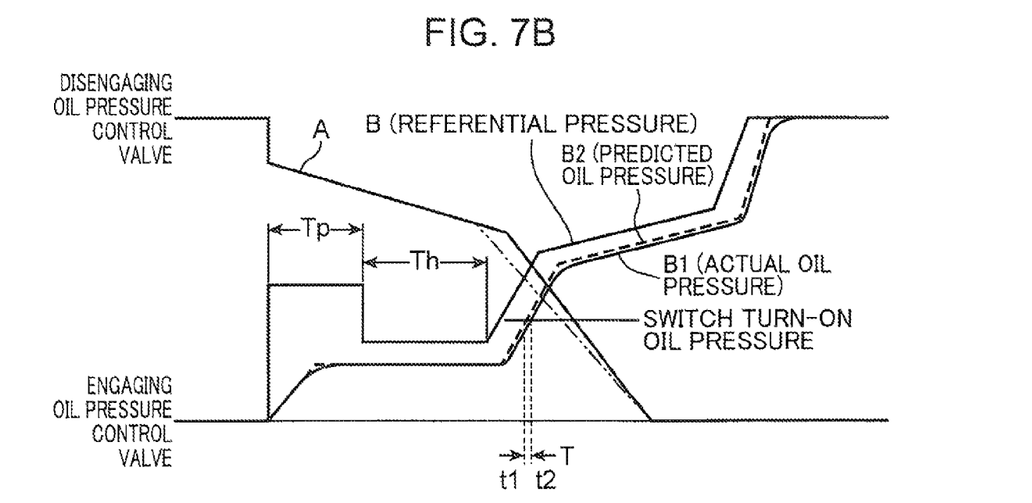
FIG. 7B is a time chart after increasing the pre-charge period with respect to that in FIG. 7A.

A disengage-side referential pressure A indicated by the two-dot chain line in FIG. 7B is the same as a disengage-side referential pressure A illustrated in FIG. 7A, i.e., a pre-improvement disengage-side referential pressure. A disengage-side referential pressure A indicated by the solid line in FIG. 7B is obtained by, as compared to the disengage-side referential pressure A illustrated in FIG. 7A, retarding the start timing of the final disengagement step with respect to the disengagement-side friction element 11, i.e., a post-improvement disengage-side referential pressure. In the post-improvement disengage-side referential pressure A, the start timing of the relatively rapid decline of the disengage-side referential pressure A is retarded because the rise timing of the predicted oil pressure B2 is retarded. This promotes suppression of the blow-up phenomenon.

On the other hand, in the case where the actual timing t2 is earlier than the predicted timing t1, the rise timing of the predicted oil pressure B2 or the predicted timing t1 of turn-on of the oil pressure switch 35 is advanced, and the amount of pre-charged operating oil is reduced, by an amount corresponding to a reduction in the pre-charge period Tp, so that the rise timing of the actual oil pressure B1 is retarded, and the actual timing t2 of turn-on of the oil pressure switch 35 is retarded. Consequently, a difference (time T') between the two timings t1, t2 is reduced to allow the actual oil pressure B1 to conform to or come close to the predicted oil pressure B2, as comparatively illustrated in FIGS. 8A and 8B.

Figure 8A:
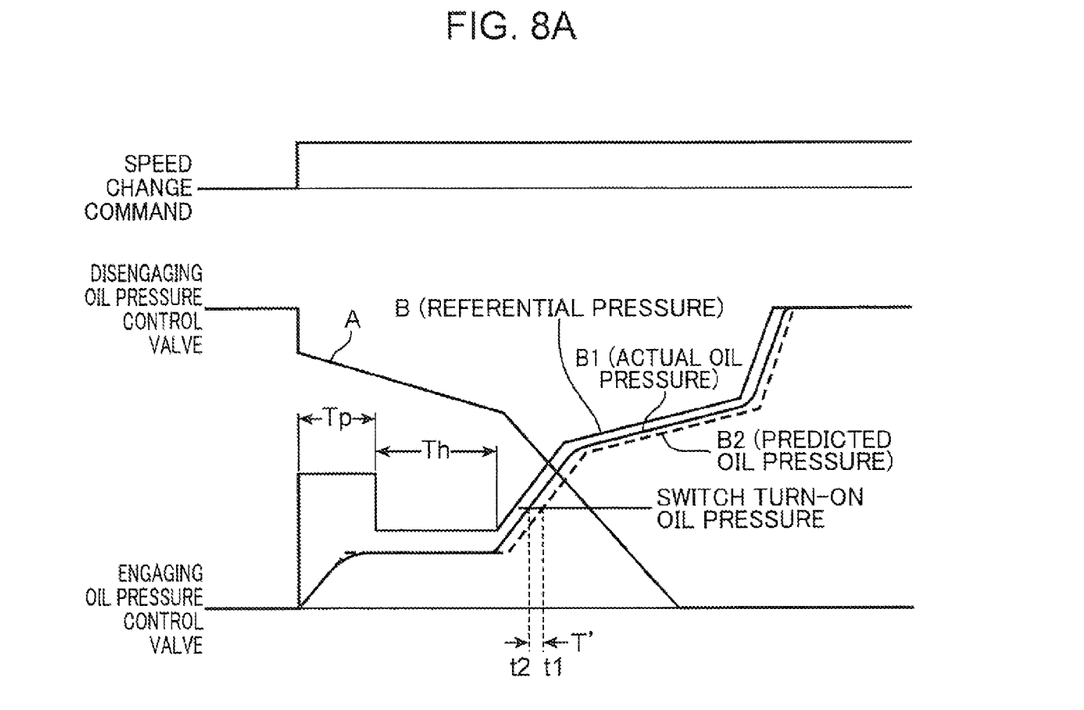
FIG. 8A is a time chart before reducing a pre-charge period.
Figure 8B:
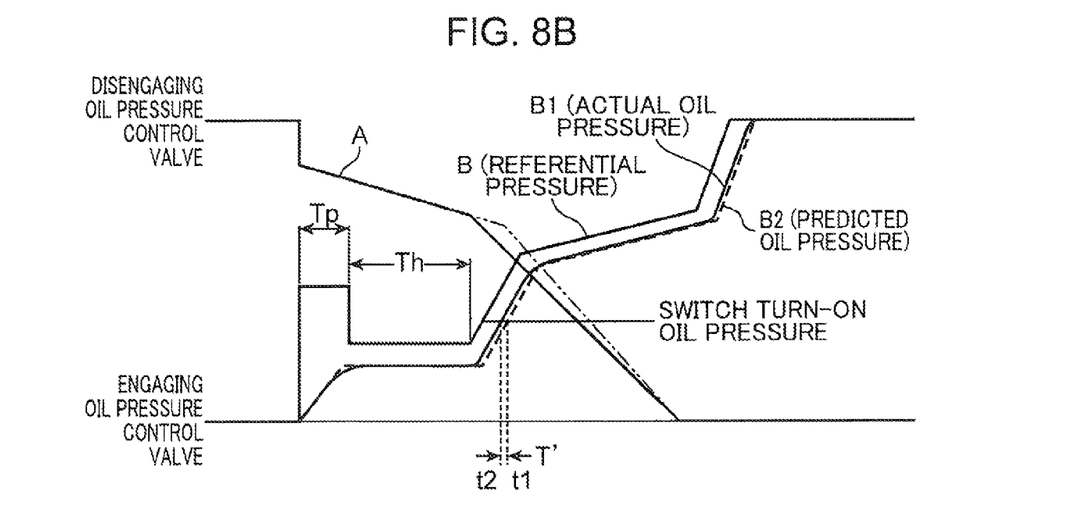
FIG. 8B is a time chart after reducing the pre-charge period with respect to that in FIG. 8A.

A disengage-side referential pressure A indicated by the two-dot chain line in FIG. 8B is the same as a disengage-side referential pressure A illustrated in FIG. 8A, i.e., a pre-improvement disengage-side referential pressure. A disengage-side referential pressure A indicated by the solid line in FIG. 8B is obtained by, as compared to the disengage-side referential pressure A illustrated in FIG. 8A, advancing the start timing of the final disengagement step with respect to the disengagement-side friction element 11, i.e., a post-improvement disengage-side referential pressure. In the post-improvement disengage-side referential pressure A, the start timing of the relatively rapid decline of the disengage-side referential pressure A is advanced because the rise timing of the predicted oil pressure B2 is advanced This promotes suppression of the pull-in phenomenon.

In the above manner, a change in the actual oil pressure B1 starting from the time of the generation of the speed change command conforms to or comes close to a change in the predicted oil pressure B2, so that the engagement operation of the engagement-side friction element 12 and the disengagement operation of the disengagement-side friction element 11 can be performed at an optimal relative timing by setting the referential pressure A of the disengagement-side friction element 11 based on the predicted oil pressure B2 during the engagement of the engagement-side friction element 12. This suppresses the output torque pull-in phenomenon, the engine speed blow-up phenomenon, etc., caused by inadequacy of the relative timing, thereby attaining a satisfactory speed change operation.

In this case, a change of the referential pressure B or the predicted oil pressure B2 is performed based on a change of the pre-charge period Tp in which a discharge rate from the oil pressure control valve 22 is large, so that it becomes possible to allow the predicted oil pressure B1 and the actual oil pressure B1 to efficiently come close to each other by a slight change of the period Tp, thereby avoiding a large increase and decrease in total speed change period.

In addition, the period Th in which an oil pressure after the pre-charge is held at a value less than that during the pre-charge is maintained constant, irrespective of a change of the pre-charge period, so that a constant period after the completion of the pre-charge through until a start of rise of an oil pressure for engaging a friction element can be always ensured, thereby avoiding the occurrence of shock during the engagement of the friction element caused by a situation where the period Th is excessively reduced along with a change of the pre-charge period.

Further, in the above configuration, the above setting of the pre-charge period is performed when the target engagement pressure of the operating pressure to be supplied to the engagement-side friction element 12 during a speed change is equal to or greater than a predetermined pressure, so that a defective control caused by a situation where the switch 35 fails to be turned on even when the operating pressure reaches the target engagement pressure, due to a tolerance and/or a variation of the turn-on oil pressure of the oil pressure switch 35.

In addition to the situation where a target engagement pressure to be supplied to the engagement-side friction element 12 during actual vehicle driving is equal to or greater than a predetermined pressure, the above pre-charge period changing control may also be performed in a testing process during production of the automatic transmission. In this case, a satisfactory speed change control is performed just after shipping of a vehicle equipped with the automatic transmission, i.e., from an initial stage or start of actual vehicle driving, without giving a passenger uncomfortable feeling.

Technical features of the above embodiment can be outlined as follows.

In the above embodiment using an automatic transmission configured to perform a speed change by, among a plurality of friction elements, disengaging a given disengagement-side friction element and concurrently engaging other engagement-side friction element, in the process for engaging the disengagement-side friction element during the speed change, operating oil is firstly pre-charged to the disengagement-side friction element, and then held at an oil pressure less than that during the pre-charge, for a given period of time, whereafter the operating pressure rises to cause the friction element to be fully engaged.

In this process, based on a difference between a predicted timing and an actually measured timing of engagement of the friction element after generation of a speed change command, the pre-charge period is set to allow the difference to become smaller, so that, during a next speed change, the pre-charge is performed for the set pre-charge period, so that a timing at which the friction element is actually engaged will conform to or come close to the predicted timing. Additionally, during the next speed change, a start timing of decline of an operating pressure against the disengagement-side friction element is changed depending on the pre-charge period set in the above manner, so that a start timing of a substantial disengagement operation of the disengagement-side friction element is temporally adjusted correspondingly to a start timing of a substantial engagement operation of the engagement-side friction element.

Thus, the disengagement operation of the disengagement-side friction element can be controlled based on the predicted timing during the engagement of the engagement-side friction element, so that it becomes possible to allow the engagement operation of the engagement-side friction element and the disengagement operation of the disengagement-side friction element to be performed at an adequate relative timing. This suppresses the output torque pull-in phenomenon, the engine speed blow-up phenomenon, etc., caused by inadequacy of the relative timing, thereby attaining a satisfactory speed change operation.

An adjustment of an engagement timing of the engagement-side friction element is performed based on a change of the pre-charge period in which a discharge rate from the oil pressure control valve is large, so that it becomes possible to efficiently reduce a difference between the predicted timing and the actual timing of engagement of the friction element, and thereby such a timing adjustment can performed without involving a large change of a total speed change period.

In addition, an oil pressure holding period in which an oil pressure after the pre-charge is held at a value less than that during the pre-charge is maintained constant, irrespective of a change of the pre-charge period, so that a constant period after the completion of the pre-charge through until a start of pressure rise for fully engaging the friction element is always ensured, thereby avoiding the occurrence of shock or the like during the engagement of the friction element caused by a situation where the oil pressure holding period is excessively reduced.

In the above embodiment, when the actually measured timing is later than the predicted timing, the pre-charge period in the pre-charge period setting step is increased, and the start timing of the final disengagement step in the disengagement start timing setting step is retarded.

In the above embodiment, when the actually measured timing is earlier than the predicted timing, the pre-charge period in the pre-charge period setting step is reduced, and the start timing of the final disengagement step in the disengagement start timing setting step is advanced.

As above, in the above embodiment, in the process for setting the pre-charge period, when the actually measured timing is later than the predicted timing, the pre-charge period is increased, on the other hand, when the actually measured timing is earlier than the predicted timing, the pre-charge period is reduced. Then, the resulting pre-charge period is reflected on the pre-charge step during a next speed change, so that a difference between the predicted timing and the actually measured timing during engagement of the friction element after generation of a speed change command is reliably reduced, and the above effects will be reliably achieved.

Additionally, when the pre-charge period is increased, the start timing of decline of the operating pressure against the disengagement-side friction element is retarded during a next speed change, on the other hand, when the pre-charge period is reduced, the start timing of decline of the operating pressure against the disengagement-side friction element is advanced during the next speed change, so that the start timing of the substantial disengagement operation of the disengagement-side friction element is adjusted in a satisfactory manner, correspondingly to the start timing of the substantial engagement operation of the engagement-side friction element. Thus, the aforementioned effects are reliably achieved.

In the above embodiment, the pre-charge period setting step and the disengagement start timing setting step are preferably performed in a testing process during production of the automatic transmission.

Specifically, in the above embodiment, the setting of the pre-charge period and the setting of the start timing of decline of the operating pressure against the disengagement-side friction element are performed in a testing process during production of the automatic transmission, so that the disengagement operation of the disengagement-side friction element and the engagement operation of the engagement-side friction element are performed at an adequate relative timing, and the occurrence of an undesirable phenomenon giving a passenger uncomfortable feeling will be reliably avoided from an initial stage or start of actual vehicle driving.

In the above embodiment, the pre-charge period setting step is performed when a target engagement pressure which is a target value of the operating pressure to be supplied to the engagement-side friction element during a speed change is equal to or greater than a predetermined pressure.

As above, in the above embodiment, the setting of the pre-charge period is performed when a target engagement pressure as a target value of the operating pressure to be supplied to the engagement-side friction element during a speed change is equal to or greater than a predetermined pressure, so that, for example, in the case where an engagement timing of the friction element is detected by an oil pressure switch, a situation where, when the target engagement pressure is low, the switch fails to be turned on, due to a tolerance and/or a variation of an oil pressure at a time when the switch is turned on, will be avoided, and thus an actual measurement of the engagement timing of the friction element will be always accurately performed.

In the above embodiment, both of the engagement operation of the engagement-side friction element and the disengagement operation of the disengagement-side friction element are controlled. Alternatively, only the engagement operation of the engagement-side friction element may be controlled, depending on the situation.

This application is based on Japanese Patent Application Serial No. 2011-092901 filed in Japan Patent Office on Apr. 19, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

Industrial Applicability

As mentioned above, the present invention allows an automatic transmission to perform, in a satisfactory manner, a speed change in which a disengagement operation of a given disengagement-side friction element and an engagement operation of other engagement-side friction element are concurrently performed. Thus, the present invention is suitably usable in the industrial field for manufacturing this type of automatic transmissions or a vehicle equipped therewith.

What is claimed is:

1. A method of controlling an automatic transmission, the automatic transmission comprising a plurality of friction elements for changing an operating state of a speed change mechanism depending on a vehicle driving state, wherein the automatic transmission is configured to perform a speed change by, among the plurality of friction elements, disengaging a given disengagement-side friction element and concurrently engaging other engagement-side friction element, the method comprising:

a pre-charge step of, based on a speed change command, pre-charging operating oil to the engagement-side friction element;

an oil pressure holding step of holding an operating pressure at an oil pressure less than an oil pressure during the pre-charge, for a given period of time;

a pressure raising step of raising the operating pressure to cause the engagement-side friction element to be engaged; and wherein the pre-charge step, the oil pressure holding step and the pressure raising step are performed in this order as a process for engaging the engagement-side friction element during the speed change, and wherein the method further comprises a pre-charge period setting step of setting a period for the operating oil pre-charge in the pre-charge step, the pre-charge period setting step including: predicting a timing at which the engagement-side friction element is to be engaged through the process for engaging the engagement-side friction element; actually measuring a timing at which the engagement-side friction element has been actually engaged through the process; and setting the pre-charge period to allow a difference between the timings to become smaller, wherein, in the pre-charge step during a next speed change, the pre-charge is performed with respect to the engagement-side friction element, for the pre-charge period set in the pre-charge period setting step.

2. The method as defined in claim 1, which further comprises:

a final disengagement step of reducing an operating pressure against the disengagement-side friction element correspondingly to the pressure raising step to disengage the disengagement-side friction element, the final disengagement step being performed as a process for disengaging the disengagement-side friction element during the speed change; and a disengagement start timing setting step of setting a start timing of the final disengagement step, the disengagement start timing setting step including setting the start timing of the final disengagement step depending on the pre-charge period set in the pre-charge period setting step, wherein, in the final disengagement step during a next speed change, the final disengagement step is started with respect to the disengagement-side friction element, at the start timing set in the disengagement start timing setting step.

3. The method as defined in claim 2, wherein, when the actually measured timing is later than the predicted timing, the pre-charge period in the pre-charge period setting step is increased, and the start timing of the final disengagement step in the disengagement start timing setting step is retarded.

4. The method as defined in claim 3, wherein, when the actually measured timing is earlier than the predicted timing, the pre-charge period in the pre-charge period setting step is reduced, and the start timing of the final disengagement step in the disengagement start timing setting step is advanced.

5. The method as defined in claim 4, wherein the pre-charge period setting step and the disengagement start timing setting step are performed in a testing process during production of the automatic transmission.

6. The method as defined in claim 5, wherein the pre-charge period setting step is performed when a target engagement pressure which is a target value of the operating pressure to be supplied to the engagement-side friction element during a speed change is equal to or greater than a predetermined pressure.

7. A control apparatus for an automatic transmission, the automatic transmission comprising a plurality of friction elements for changing an operating state of a speed change mechanism depending on a vehicle driving state, wherein the automatic transmission is configured to perform a speed change by, among the plurality of friction elements, disengaging a given disengagement-side friction element and concurrently engaging other engagement-side friction element, the control apparatus comprising:

a pre-charge device for, based on a speed change command, pre-charging operating oil to the engagement-side friction element;

an oil pressure holding device for, after the operating oil pre-charge by the pre-charge device, holding an operating pressure at an oil pressure less than an oil pressure during the pre-charge, for a given period of time; and a pressure raising device for, after the oil pressure holding operation by the oil pressure holding device, raising the operating pressure to cause the engagement-side friction element to be engaged, wherein the pre-charge device, the oil pressure holding device and the pressure raising device are provided as a means to engage the engagement-side friction element during the speed change, and wherein the control apparatus further comprises a pre-charge period setting device for setting a period for the operating oil pre-charge by the pre-charge device, the pre-charge period setting device being configured to predict a timing at which the engagement-side friction element is to be engaged by the devices for engaging the engagement-side friction element, while actually measuring a timing at which the engagement-side friction element has been actually engaged by the devices, and set the pre-charge period to allow a difference between the timings to become smaller, wherein the pre-charge device is operable, during a next speed change, to perform the pre-charge with respect to the engagement-side friction element, for the pre-charge period set by the pre-charge period setting device.

8. An automatic transmission system comprising:
a plurality of friction elements for changing an operating state of a speed change mechanism depending on a vehicle driving state;
a hydraulic actuator for driving each of the friction elements;
an oil pressure control circuit having an oil pressure control valve for controlling an oil pressure against the hydraulic actuator;
an oil pressure detection device for detecting that the oil pressure against the hydraulic actuator is equal to or greater than a predetermined engagement pressure; and
a control unit configured to receive an input of a signal from the oil pressure detection device, and control the oil pressure control valve, the control unit being operable: based on a speed change command, to control the oil pressure control valve to pre-charge operating oil to a given engagement-side friction element among the plurality of friction elements; after the operating oil pre-charge, to control the oil pressure control valve to hold an operating pressure at an oil pressure less than an oil pressure during the pre-charge, for a given period of time; and after the oil pressure holding operation, to control the oil pressure control valve to raise the operating pressure to cause the engagement-side friction element to be engaged, wherein the control unit is operable to predict a timing at which the engagement-side friction element is to be engaged, while actually measuring, based on the signal from the oil pressure detection device, a timing at which the engagement-side friction element has been actually engaged, and set the operating oil pre-charge period to allow a difference between the timings to become smaller, and wherein the control unit is operable, during a next speed change, to control the oil pressure control valve to pre-charge operating oil to the hydraulic actuator of the engagement-side friction element, for the set pre-charge period.

9. The method as defined in claim 4, wherein the pre-charge period setting step is performed when a target engagement pressure which is a target value of the operating pressure to be supplied to the engagement-side friction element during a speed change is equal to or greater than a predetermined pressure.

10. The method as defined in claim 3, wherein the pre-charge period setting step and the disengagement start timing setting step are performed in a testing process during production of the automatic transmission.

11. The method as defined in claim 8, wherein the pre-charge period setting step is performed when a target engagement pressure which is a target value of the operating pressure to be supplied to the engagement-side friction element during a speed change is equal to or greater than a predetermined pressure.

12. The method as defined in claim 3, wherein the pre-charge period setting step is performed when a target engagement pressure which is a target value of the operating pressure to be supplied to the engagement-side friction element during a speed change is equal to or greater than a predetermined pressure.

13. The method as defined in claim 2, wherein, when the actually measured timing is earlier than the predicted timing, the pre-charge period in the pre-charge period setting step is reduced, and the start timing of the final disengagement step in the disengagement start timing setting step is advanced.

14. The method as defined in claim 11, wherein the pre-charge period setting step and the disengagement start timing setting step are performed in a testing process during production of the automatic transmission.

15. The method as defined in claim 12, wherein the pre-charge period setting step is performed when a target engagement pressure which is a target value of the operating pressure to be supplied to the engagement-side friction element during a speed change is equal to or greater than a predetermined pressure.

16. The method as defined in claim 11, wherein the pre-charge period setting step is performed when a target engagement pressure which is a target value of the operating pressure to be supplied to the engagement-side friction element during a speed change is equal to or greater than a predetermined pressure.

17. The method as defined in claim 2, wherein the pre-charge period setting step and the disengagement start timing setting step are performed in a testing process during production of the automatic transmission.

18. The method as defined in claim 15, wherein the pre-charge period setting step is performed when a target engagement pressure which is a target value of the operating pressure to be supplied to the engagement-side friction element during a speed change is equal to or greater than a predetermined pressure.

19. The method as defined in claim 2, wherein the pre-charge period setting step is performed when a target engagement pressure which is a target value of the operating pressure to be supplied to the engagement-side friction element during a speed change is equal to or greater than a predetermined pressure.

20. The method as defined in claim 1, wherein the pre-charge period setting step is performed when a target engagement pressure which is a target value of the operating pressure to be supplied to the engagement-side friction element during a speed change is equal to or greater than a predetermined pressure.

* * * * *